(12) United States Patent
Pelczer et al.

(10) Patent No.: US 11,686,364 B2
(45) Date of Patent: Jun. 27, 2023

(54) FRICTIONAL DAMPER

(71) Applicant: SUSPA GmbH, Altdorf (DE)

(72) Inventors: Andreas Pelczer, Altdorf (DE); Michael Bauer, Freihung (DE); Sebastian Ertl, Edelsfeld (DE); Marco Mayer, Sulzbach-Rosenberg (DE); Michael Weder, Nuremberg (DE)

(73) Assignee: SUSPA GmbH, Altdorf (DE)

( * ) Notice: Subject to any disclaimer, the term of this patent is extended or adjusted under 35 U.S.C. 154(b) by 191 days.

(21) Appl. No.: 17/038,900

(22) Filed: Sep. 30, 2020

(65) Prior Publication Data

US 2021/0115994 A1    Apr. 22, 2021

(30) Foreign Application Priority Data

Oct. 16, 2019 (DE) .............. 10 2019 215 931.1

(51) Int. Cl.
*F16F 7/09* (2006.01)
*D06F 37/20* (2006.01)

(52) U.S. Cl.
CPC .............. *F16F 7/09* (2013.01); *D06F 37/20* (2013.01); *F16F 2222/04* (2013.01); *F16F 2224/02* (2013.01); *F16F 2224/0208* (2013.01); *F16F 2226/00* (2013.01); *F16F 2228/007* (2013.01); *F16F 2228/08* (2013.01); *F16F 2230/0005* (2013.01); *F16F 2232/08* (2013.01); *F16F 2234/02* (2013.01)

(58) Field of Classification Search
CPC ...... F16F 7/09; F16F 2222/04; F16F 2228/08; F16F 2230/0005; F16F 2232/08; F16F 2234/04; F16F 2234/02; F16F 2224/02; F16F 2224/0208; F16F 2226/00; F16F 2228/007; D06F 37/20
See application file for complete search history.

(56) References Cited

U.S. PATENT DOCUMENTS

| | | | |
|---|---|---|---|
| 4,934,493 A | 6/1990 | Bauer et al. | |
| 5,961,105 A * | 10/1999 | Ehrnsberger | D06F 37/20 188/129 |
| 6,968,930 B2 | 11/2005 | Shibao et al. | |
| 2004/0032068 A1 | 2/2004 | Shibao | |
| 2015/0020551 A1 | 1/2015 | Yu et al. | |
| 2017/0292215 A1 * | 10/2017 | Na | F16F 7/08 |

FOREIGN PATENT DOCUMENTS

| | | | |
|---|---|---|---|
| DE | 2019134 A1 | 11/1971 | |
| DE | 3811742 A1 | 10/1989 | |
| DE | 10336060 A1 | 3/2004 | |
| DE | 202016102547 U1 | 8/2017 | |
| EP | 0336176 A2 | 10/1989 | |
| RU | 2645659 C2 | 2/2018 | |
| WO | WO-0114763 A1 * | 3/2001 | ............. D06F 37/20 |
| WO | 2014180494 A1 | 11/2014 | |

* cited by examiner

*Primary Examiner* — Xuan Lan Nguyen
(74) *Attorney, Agent, or Firm* — McGlew and Tuttle, P.C.

(57) ABSTRACT

A frictional damper is designed with a tubular housing having a longitudinal axis, with a tappet, which is displaceable in the housing along the longitudinal axis and is led out at an open end of the housing, with a frictional element lying against the tappet and with a cap attached to the open end of the housing with axial prestressing relative to the longitudinal axis.

18 Claims, 6 Drawing Sheets

US 11,686,364 B2

FRICTIONAL DAMPER

CROSS-REFERENCES TO RELATED APPLICATIONS

This application claims the priority of German Patent Application, Serial No. 10 2019 215 931.1, filed Oct. 16, 2019, pursuant to 35 U.S.C. 119(a)-(d), the content of which is incorporated herein by reference in its entirety as if fully set forth herein.

FIELD OF THE INVENTION

The invention relates to a frictional damper, which is used in particular for washing machines.

BACKGROUND OF THE INVENTION

Such a frictional damper is disclosed in DE 38 11 742 A1. In the frictional damper a damping liner serves to generate a frictional force between a housing and a tappet displaceable lengthwise in relation to the former. The damping liner is arranged in a cap, which serves as damping housing. The cap is axially fixed to the housing. The cap is axially fixed, for example, by adhesive bonding, welding or bordering of the housing. These connections are technically expensive to produce. The cap can also be affixed by means of a press fit or a latched connection. Owing to tolerance deviations in the production of the cap and/or the housing, there is a risk of the cap being detached from the housing. Any axial play between the cap and the housing due to tolerance deviations may give rise to unwanted noise nuisance in the operation of the frictional damper. In the event of tensile stresses on the damper there is the risk of the latched connection coming loose.

Further frictional dampers are disclosed by DE 103 36 060 A1, DE 20 2016 102 547 U1, DE 20 19 134 A and WO 2014/180 494 A1.

SUMMARY OF THE INVENTION

The object of the invention is to create a frictional damper in which the manner of fixing a cap to the housing is uncomplicated and reliable.

The object is achieved by a frictional damper having a tubular housing having a longitudinal axis, a tappet, which is displaceable in the housing along the longitudinal axis and is led out at an open end of the housing, a frictional element lying against the tappet and a cap attached to the open end of the housing with axial pre-stressing relative to the longitudinal axis. The core of the invention resides in the fact that a cap is attached to a housing of a frictional damper with axial prestressing relative to a longitudinal axis of the housing. The axially prestressed arrangement of the cap on the housing precludes the occurrence of axial play between the cap and the housing. An unwanted noise nuisance due to rattling of the cap on the housing is reliably prevented.

The cap is in particular designed as a one-piece component. The cap is in particular produced from a lightweight material. The cap is in particular produced from a material having elastic characteristics. The cap is in particular produced from a plastic material, in particular by an injection moulding process.

The housing is tubular, in particular of cylindrical tube shape, and in particular of thin-walled design. In principle, other hollow profile shapes are also feasible for the design of the housing. The housing is in particular produced from a lightweight material, such as a light metal, for example, in particular an aluminium alloy or plastic material, in particular by an injection moulding process.

In the housing a tappet is displaceably arranged along the longitudinal axis. The external contour of the tappet corresponds to the internal contour of the housing. The tappet is in particular displaceably guided along the housing. For this purpose, axial guide webs, against which the tappet with its outer surface lies substantially free of play but without any friction, may be provided on an internal surface of the housing. The tappet is in particular of hollow, in particular tubular design. The tappet is in particular produced from a lightweight material, such as an aluminium alloy, for example, or a plastic material. It is advantageous if the tappet is produced from a material having good thermal conductivity characteristics, such as steel, aluminium or an aluminium alloy, for example. The tappet then has a good heat dissipation. The thermal conductivity $\lambda$ of the tappet material is preferably at least 30 W/(m·K), in particular at least 40 W/(m·K), in particular at least 50 W/(m·K), in particular at least 75 W/(m·K), in particular at least 100 W/(m·K), in particular at least 150 W/(m·K), in particular at least 200 W/(m·K) and in particular at least 230 W/(m·K). Under low frictional forces the heat generated on the tappet is reduced. In this case the tappet may be produced from plastic material.

The frictional damper comprises a frictional element which lies against the tappet. The frictional element serves to generate a frictional force in relation to the housing under axial displacement of the tappet. The frictional element lies in particular against an outside of the tappet. The frictional element is designed in particular as a frictional strip, which in particular is laid annularly around the outside of the tappet. The frictional element may also comprise multiple frictional strips, which are arranged along the circumference of the tappet and/or in series in an axial direction of the tappet. The frictional element may also be designed as a frictional ring. The frictional element in particular comprises a frictional material, in particular an elastic foam material. To improve the frictional conditions the frictional material may be impregnated with grease.

A frictional damper configured such that at least one latch hook, which engages in a latch recess of the cap, is arranged on the housing, in particular at the open end, allows a reliable, in particular self-locking, latched connection of the cap to the housing. The housing has at least one latch hook and in particular multiple latch hooks, in particular precisely two latch hooks, which are arranged diametrically opposite on the housing relative to the longitudinal axis. The fact that the latch hook is arranged on the housing makes the latched connection of the cap particularly reliable. Accidental unlatching is largely precluded.

In the frictional damper configured such that the latch recess is arranged on an outside of the cap and the latch hook hooks into the latch recess in a radial direction relative to the longitudinal axis, the self-locking arrangement of the cap on the housing is improved.

An embodiment of the frictional damper configured such that the latch hook has a latch hook length which is oriented along the longitudinal axis and which in the disassembled state of the cap is greater than an axial latch recess interval of the cap, allows an uncomplicated attachment of the cap to the housing with axial pre-stressing. The latch hook length is greater than the axial latch recess interval and is in particular at least 1.01 times, in particular at least 1.02 times, in particular at least 1.05 times, in particular at least 1.08 times, in particular at least 1.10 times and in particular 1.15 times the axial latch recess interval. In particular, the latched connection between the cap and the housing serves for applying the axial prestressing. The axial prestressing of the cap is reliably ensured.

A frictional damper configured such that the housing at the open end has an end face which is uneven, makes it easier to fit the cap to the housing.

A frictional damper configured such that the end face has a depression in the area of the latch hook, affords an additional improvement in the fitting of the cap.

A frictional damper configured such that the cap comprises a radial flange for the end face to bear against the open end of the housing, ensures an axially defined arrangement of the cap on the housing.

A frictional damper configured such that the cap is arranged, secured against torsion, on the housing, ensures a torsion-resistant attachment of the cap to the housing.

A frictional damper configured such that the housing comprises a receiving portion to receive the cap, the receiving portion in particular extending up to the open end, ensures an uncomplicated seating of the cap on the housing.

A frictional damper configured such that the frictional element is arranged pre-stressed along the longitudinal axis between the housing and the cap and/or in a radial direction relative to the longitudinal axis between the tappet and the cap, allows compression of the frictional element in an axial direction and/or in a radial direction relative to the longitudinal axis. The frictional damper has defined, in particular variably adjustable frictional properties. The axial prestressing of the cap on the housing is improved.

The cap of the frictional damper configured such that the cap is of sleeve-like design, in particular has a circumferentially closed sleeve portion and in particular is not of slotted design, is inherently dimensionally stable. It is ensured that grease to which the frictional element is subjected cannot accidentally escape out of the cap. The functional reliability and the service life of the frictional damper are increased.

Both the features specified in the patent claims and the features described in the following exemplary embodiment of the frictional damper according to the invention are in each case suited, either individually or in combination with one another, to further development of the subject matter of the invention. The respective combinations of features do not constitute any limitation on further developments of the subject matter of the invention, but essentially are only in the nature of examples.

Further features, advantages and details of the invention emerge from the following description of an exemplary embodiment, with reference to the drawing.

DESCRIPTION OF THE PREFERRED EMBODIMENT

Figure 1:
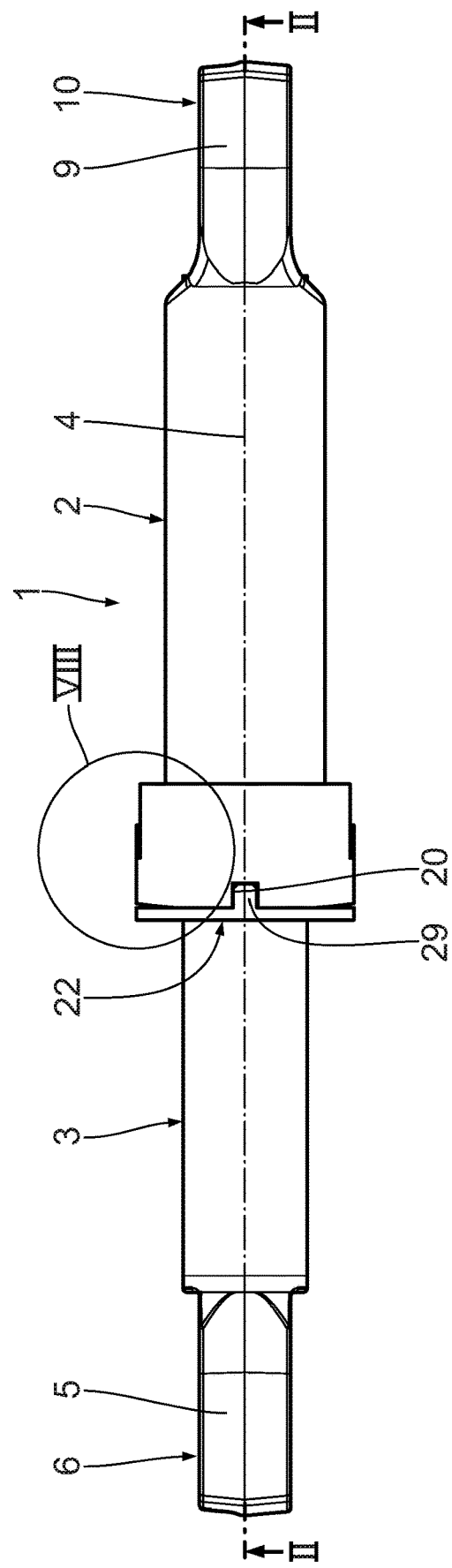
FIG. 1 shows a side view of a frictional damper according to the invention.
Figure 2:
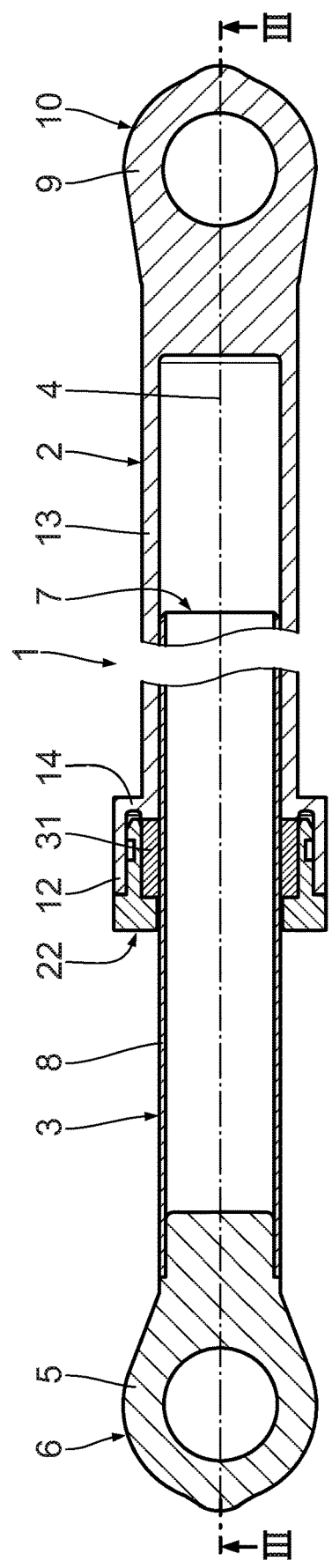
FIG. 2 shows a representation in longitudinal section along the line of section II-II in FIG. 1.
Figure 3:
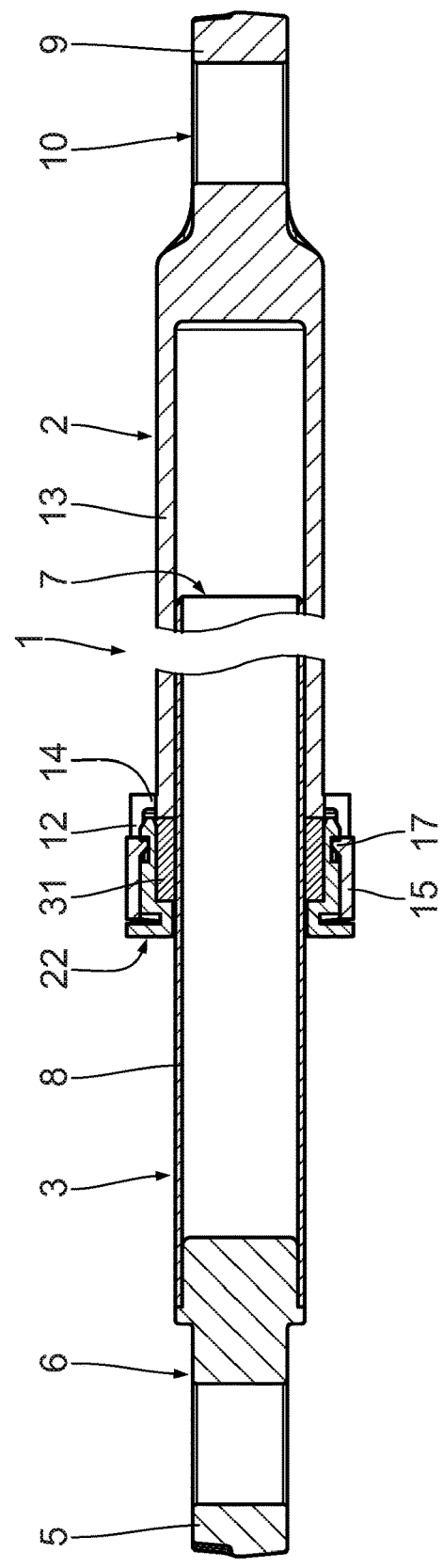
FIG. 3 shows a sectional representation along the line of section III-III in FIG. 2.

A frictional damper represented as a whole by 1 in FIGS. 1 to 3 serves for use in washing machines for damping vibrations. The frictional damper 1 comprises a cylindrical housing 2 and a tubular tappet 3, which arranged along a longitudinal axis 4 of the housing 2 is displaceably guided in the latter.

The tappet 3 comprises a first fixing element 5, by means of which the frictional damper 1 can be fixed to an object. The first fixing element 5 is arranged at a free end 6 of the tappet 3. The free end 6 of the tappet 3 is arranged opposite the housing-side end 7, with which the tappet 3 is arranged in the housing 2.

The tappet 3 comprises a tappet tube 8, which is produced in particular from a lightweight material, in particular from a light metal, in particular from an aluminium alloy. The tappet 3 may also be produced from another material. According to the exemplary embodiment shown, at the free end 6 the first fixing element 5 is inserted into the tappet tube 8 at the end face and fixed thereto. The tappet 3 may also be produced in one piece.

The housing 2 comprises a second fixing element 9, which is arranged at a free end 10 of the housing 2. The fixing elements 5, 9 are arranged opposite one another on the frictional damper 1 along the longitudinal axis 4. The fixing elements 5, 9 serve for fixing the frictional damper 1 in the washing machine.

The housing 2 is in particular produced in one piece from plastic material, in particular by injection moulding. The housing 2 has an open end 11 arranged opposite the free end 10.

The housing 2 comprises a receiving portion 12 and a guide portion 13. The guide portion 13 serves for axially guiding the tappet 3 in the housing 2. Along the guide portion 13, guide elements (not further represented), in particular axially oriented guide webs, which in particular project radially inwards on the inside of the housing 2, may be provided on an inside of the housing 2.

The receiving portion 12 is widened radially compared to the guide portion 13. The receiving portion 12 is integrally connected to the guide portion 13 by an annular collar 14. The receiving portion 12 extends up to the open end 11 of the housing 2.

The housing 2 comprises two latch hooks 15 arranged diametrically opposite relative to the longitudinal axis 4. The latch hooks 15 extend on the housing 2 in the area of the receiving portion 12 in a direction parallel to the longitudinal axis 4. For this purpose, the housing 2 has a material recess 16 in the area of each of the latch hooks 15, in order to give the latch hook 15 the necessary structural flexibility for the latching and unlatching process. It is advantageous if the housing 2 is produced from a material which possesses a material elasticity. According to the exemplary embodiment shown, the housing 2 is produced from plastic, in particular by an injection moulding process. The modulus of elasticity of the plastic material used lies, in particular, between 1000 N/mm² and 4000 N/mm², in particular between 1500 N/mm² and 3000 N/mm² and in particular between 2000 N/mm² and 2500 N/mm².

The latch hooks 15 are each integrally formed on the housing 2, in particular on the receiving portion 12.

Each latch hook 15 has a lug 17 projecting radially inwards. The latch hook 15 is moulded on the receiving portion 12 so that it is pivotally displaceable about a pivot axis 36. The pivot axis 36 is oriented perpendicular to the longitudinal axis 4 and runs at distance from the longitudinal axis 4 in the area of the outside wall of the receiving portion 12. The facility to pivot about the pivot axis 36 means that the latch hook 15 can be pivoted inwards or outwards on the receiving portion 12 substantially in a radial direction relative to the longitudinal axis 4.

At the open end 11 the housing 2 has an annular end face 18, which is not flat. Along the circumference of the end face 18 depressions 19 are provided in the area of each of the latch hooks 15. The depressions 19 are each of trough-shaped, in particular curved design.

At the open end 11 two slot-shaped recesses 20 are arranged, extending from the end face 18 in a direction parallel to the longitudinal axis 4. The recesses 20 are arranged diametrically opposite relative to the longitudinal axis 4. It is feasible to provide only one recess 20 or more than two recesses 20. According to the exemplary embodiment shown, the recesses 20 are each arranged in an area of the end face 18 in which a depression 19 is not provided.

The latch hook 15 has a latch hook length $L_{RH}$ oriented along the longitudinal axis 4. The latch hook length $L_{RH}$ is defined by the axial distance of the end face 18, particularly in the area without a depression 19, from a lug end face 21 of the lug 17 remote from the end face 18.

Figure 4:
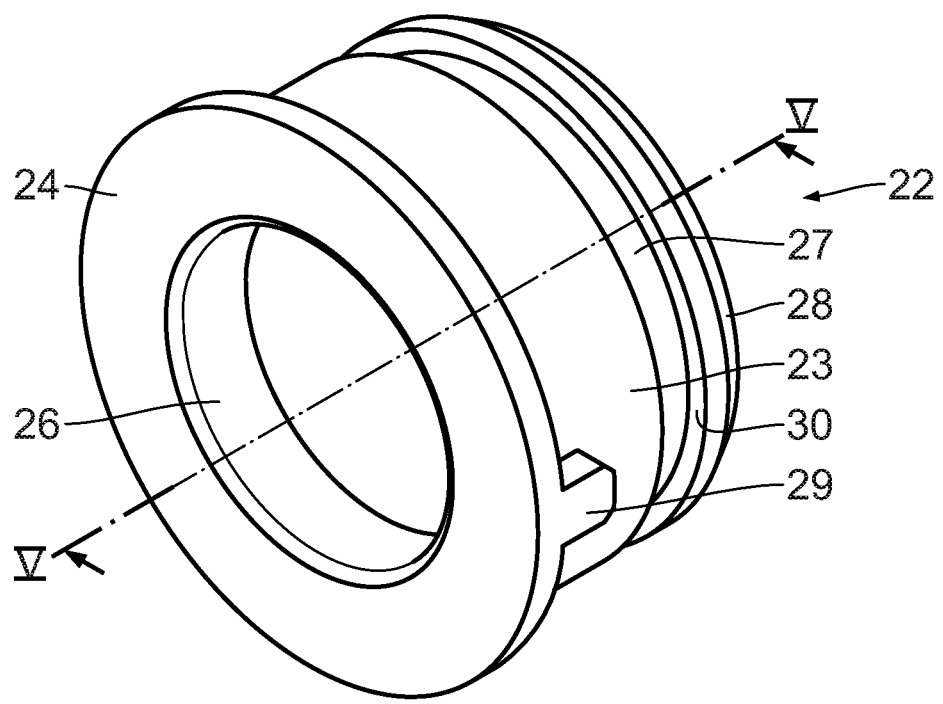
FIG. 4 shows a perspective representation of a cap of the frictional damper in FIG. 1.
Figure 5:
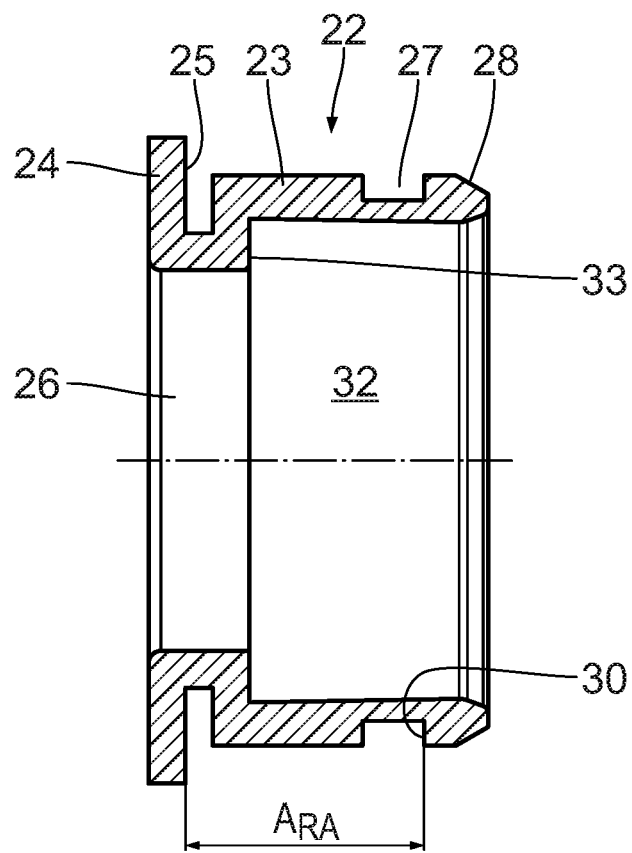
FIG. 5 shows a sectional representation along the line of section V-V in FIG. 4.
Figure 6:
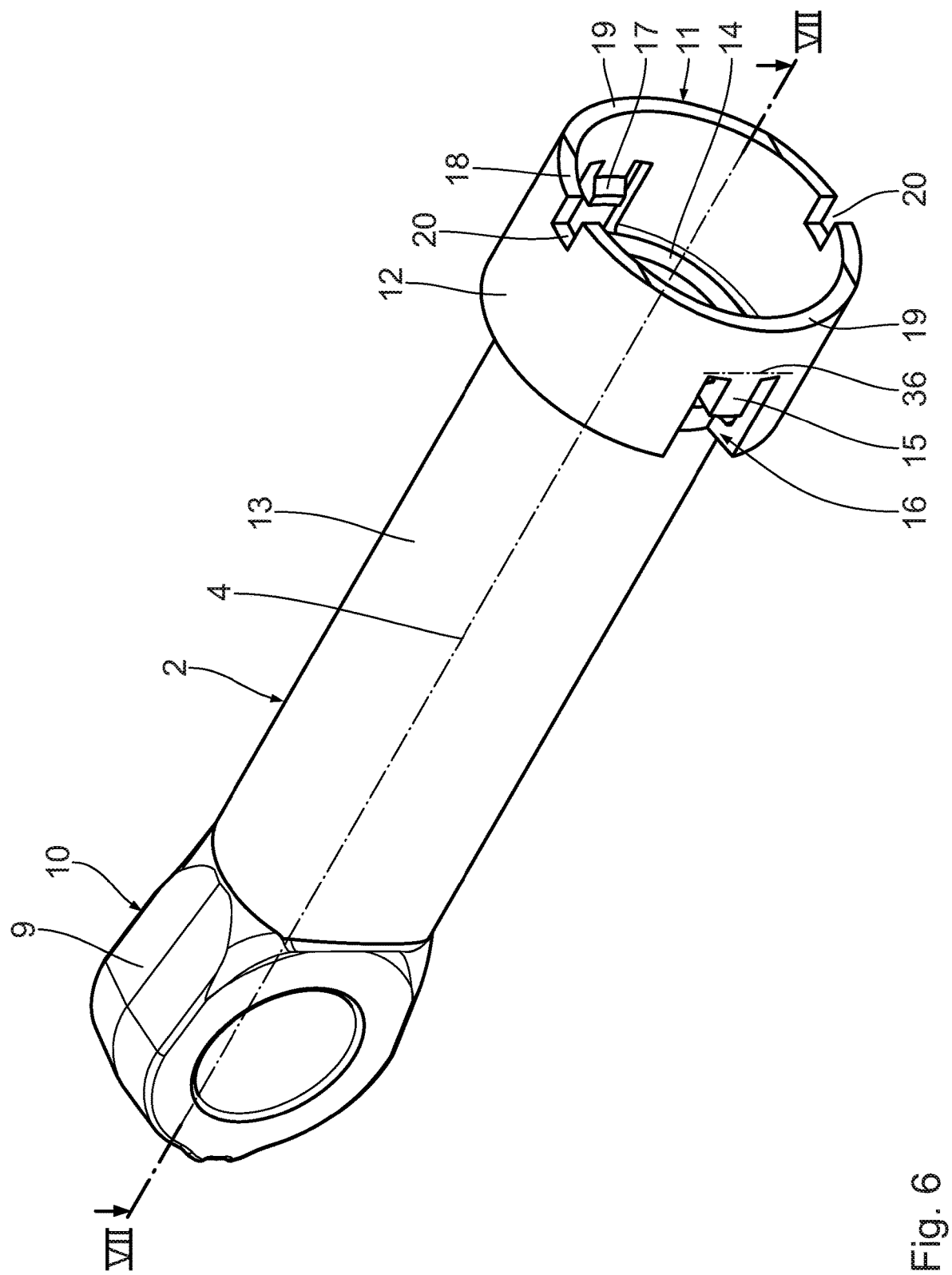
FIG. 6 shows a perspective representation of a housing of the frictional damper in FIG. 1.
Figure 7:
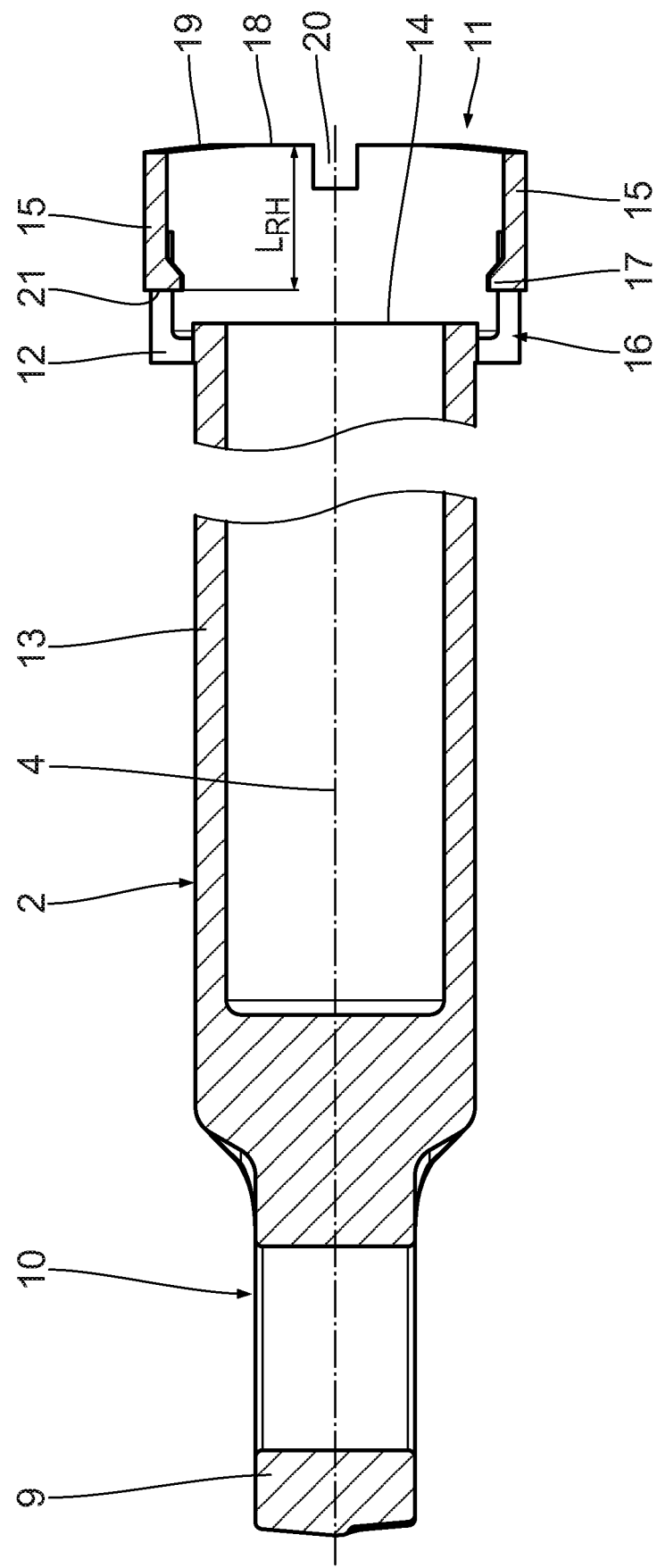
FIG. 7 shows a sectional representation of the housing along the line of section VII-VII in FIG. 6.

The receiving portion 12 serves to receive a cap 22, which is represented in more detail in FIGS. 4 and 5. The cap 22 is substantially of sleeve-like design and comprises a circumferentially closed sleeve portion 23. Integrally joined to the sleeve portion 23 is a radial flange 24, which with its underside 25 facing the sleeve portion 23 serves to bear against the end face 18 of the housing 2.

The cap 22 has a passage 26, through which the tappet 3 is led. A circumferential external groove 27, which forms a latch recess, is provided in the area of the sleeve portion 23. At its opposite end to the radial flange 24 the cap 22 has an insertion bevel 28, which makes it easier to introduce the cap 22 into the housing 2.

The cap 22 has an axial latch recess interval $A_{RA}$ which defines the axial distance of the groove flank 30 of the external groove 27, remote from the underside 25, from the underside 25.

The latch hook length $L_{RH}$ is greater than the axial latch recess interval $A_{RA}$. In particular: $L_{RH} \geq 1.01 \times A_{RA}$, in particular $L_{RH} \geq 1.02 \times A_{RA}$, in particular $L_{RH} \geq 1.05 \times A_{RA}$, in particular $L_{RH} \geq 1.08 \times A_{RA}$, in particular $L_{RH} \geq 1.10 \times A_{RA}$ and in particular $L_{RH} \geq 1.15 \times A_{RA}$.

The cap 22 has a frictional element socket 32 which is designed as a cylindrical recess in the area of the sleeve portion 23. The frictional element socket 32 has an enlarged inside diameter compared to the passage 26. A seating shoulder 33 is formed at the transition from the passage 26 to the frictional element socket 32.

Two axial webs 29 are formed on the underside 25. The axial webs 29 are arranged diametrically opposite on the outer circumference of the radial flange 24.

In the fitted state of the cap 22 on the housing 2 the axial webs 29 engage in the corresponding recesses 20 on the housing 2. The cap 22 is thereby held on the housing 2, secured against torsion about the longitudinal axis 4.

The cap 22 is axially secured on the housing 2 by the latch hooks 15 with the lugs 17, which engage in the latch recesses, that is to say in the external groove 27, of the cap 22.

A frictional element 31 is arranged in the housing 2, in particular in the area of the receiving portion 12. According to the exemplary embodiment shown, the frictional element 31 is designed as a frictional strip, which is laid around the tappet 3. The frictional element 31 is arranged in the frictional element socket 32 of the cap 22.

In the frictional damper 1 the frictional element 31 is arranged and in particular prestressed in a radial direction relative to the longitudinal axis 4 between the cap 22 and the tappet 3. In an axial direction relative to the longitudinal axis 4 the frictional element 31 is arranged, in particular prestressed, between the seating shoulder 33 of the cap 22 and the annular collar of the housing 2.

Figure 8:
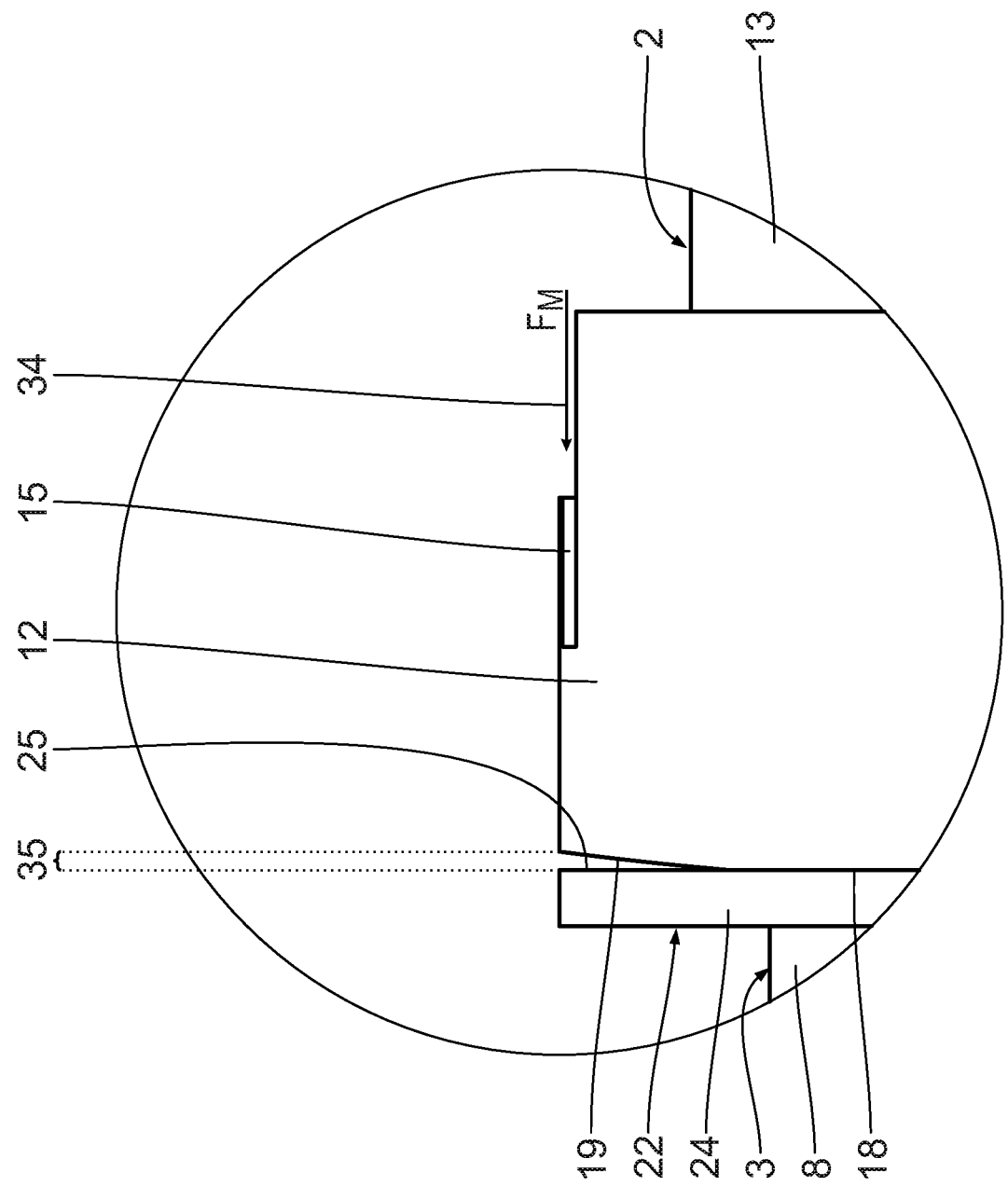
FIG. 8 shows an enlarged detailed representation of the detail VIII in FIG. 1.

The fitting of the frictional damper 1 and in particular the axially prestressed arrangement of the cap 22 on the housing 2 is explained in more detail below. The fitting of the cap 22 on the housing 2, in particular the application of the fitting force $F_M$ to the latch hooks 15, is shown in the detailed representation in FIG. 8.

To fit the cap on the housing 2, the cap 22 with the insertion bevel 28 is introduced into the open end 11 of the housing 2 and pushed along the longitudinal axis 4. As soon as the insertion bevel 28 of the cap 22 comes into contact with the lugs 17 of the latch hooks 15, a resistance force, which can be manually overcome, counteracts the insertion force. Inserting the cap 22 further causes the latch hooks 15 to pivot radially outwards, that is away from the longitudinal axis 4. The cap 22 is pushed so far into the housing 2 until the cap 22 bears with the underside 25 against the end face 18 of the housing 2. In so doing, the cap 22 is oriented in its rotational position about the longitudinal axis 4 so that the axial webs 29 align with the slot-shaped recesses 20.

Since the latch hook length $L_{RH}$ in the disassembled state of the cap 22 is greater than the axial latch recess interval $A_{RA}$, the latch hooks 15 cannot readily latch in the latch recesses of the external groove 27. In order to latch the latch hooks 15, it is necessary to press the latch hooks 15 in a fitting direction 34 applying a fitting force $F_M$. The fitting direction 34 is oriented parallel to the longitudinal axis 4 and directed towards the underside 25 of the cap 22. Since the end face 18 has the depression 19 in the area of the latch hooks 15, there is a resulting axial play 35 between the underside 25 of the radial flange 24 and the depression 19. The axial play 35 allows a locally limited, elastic deformation of the housing 2, in particular in the area of the receiving portion 12 and in particular in the area of the latch hook 15. In particular, the axial play 35 is greater than the difference in length between the latch hook length $L_{RH}$ and the axial latch recess interval $A_{RA}$. It is thereby possible for the cap 22 to be pushed so far in the fitting direction 34 until the lug 17 can be pressed radially inwards into the external groove 27, that is to say it engages behind the insertion bevel 28. In fitting, once the axial play 35 is overcome, it is feasible for the latch hook 15 with the lug 17 to snap spontaneously radially inwards into the external groove 27 due to the elastic recovery force, without the need to manually press the latch hook 15 in.

When the latch hook 15 with the lug 17 is latched in the external groove 27, the lug end face 21 comes to bear against the remote groove flank 30. The latch hook 15 is reliably and stably latched in the latch recess of the cap 22.

On relieving of the lug 17, that is to say once the axial fitting force $F_M$ is relaxed, the latch hook 15 is pressed in an axial and/or radial direction towards the cap 22 owing to the impressed elastic force resulting from the local deformation. Since the latch hook length $L_{RH}$ is greater than the axial latch recess interval $A_{RA}$, the latch hook 15 is no longer capable of spontaneously assuming the position it adopted in the disassembled state of the cap 22. The latch hook 15 applies an axial prestressing to the cap 22 on the housing. The cap 22 is held by axial prestressing on the housing 2. In particular, the frictional element 31 is arranged, axially prestressed, between the seating shoulder 33 and the annular collar 14.

According to the exemplary embodiment shown, the frictional element 31 is arranged between the tappet 3 and the cap 22, prestressed in a radial direction relative to the longitudinal axis 4. The radial prestressing results, in particular, from the fact that the thickness of the frictional element 31 is greater than the width of the annular space formed between the tappet 3 and the cap 22.

The frictional element 31 may also be arranged with an axial play between the annular collar 14 and the seating shoulder 33. In such an arrangement the frictional damper would have a free-travel function. The free-travel function means that an axial free-travel stroke of the tappet 3 relative to the housing 2 is possible without frictional. The free-travel stroke is equal to the axial play, that is to say the difference in the axial distance between the annular collar 15 and the seating shoulder 33 and the length of the frictional element 31. It is advantageous for the free-travel function if the thickness of the frictional element 31 is less, in particular slightly less, than the annular intermediate space between the outer surface of the tappet 3 and the inner surface of the cap 22. In this case the frictional element 31 with the tappet 3, due to the static friction between the frictional element 31 and the tappet 3, is carried along by a stroke movement of the latter until the frictional element 31 bears axially against the annular collar 14 or the seating shoulder 33. If a further axial displacement of the frictional element is prevented, a relative movement occurs between the tappet 3 and the frictional element 31 which then gives rise to a frictional force.

A free-travel function does not occur if, due to the surface unit pressure between the housing 2 and the frictional element 31 on the one hand and/or between the frictional element 31 and the tappet 3 on the other, a retaining force acts on the frictional element 31 which gives rise to a frictional force in the event of a relative movement between the tappet 3 and the frictional element 31 or between the frictional element 31 and the housing 2.

In an extending movement of the tappet 3 the friction applies an extraction force to the cap 22, which is transmitted to the housing 2. Since, in an axial direction relative to the longitudinal axis 4, the pivot axis 36 is situated closer towards the open end 11 than the lug 17 of the latch hook 15, the frictional force transmitted to the housing 2 produces a torque acting on the latch hook 15, in such a way that the latch hook 15 is displaced into the interior of the housing towards the cap 22, that is to say into the latch recess. The arrangement of the cap 22 on the housing 2 is in particular self-locking. An accidental detachment of the cap 22 from housing 2 is precluded.

What is claimed is:

1. A frictional damper comprising:
   a tubular housing having a longitudinal axis;
   a tappet, which is displaceable in the housing along the longitudinal axis and is led out at an open end of the housing;
   a frictional element lying against the tappet;
   a cap attached to the open end of the housing with axial prestressing relative to the longitudinal axis; and
   at least one latch hook arranged on the housing, wherein the at least one latch hook engages in a latch recess of the cap, wherein the latch hook has a latch hook length which is oriented along the longitudinal axis and which in the disassembled state of the cap is greater than an axial latch recess interval of the cap, the latch hook length being defined by an axial distance of an end face of the housing from a lug end face of the lug, the lug end face being arranged remote from the end face, wherein the axial latch recess interval defines an axial distance of a groove flank of the external groove from an underside of a radial flange of the cap, the groove flank being remote from the underside.

2. The frictional damper according to claim 1, wherein the at least one latch hook is arranged on the housing at the open end.

3. The frictional damper according to claim 1, wherein the housing at the open end has an end face which is uneven.

4. The frictional damper according to claim 3, wherein the end face has a depression in an area of the latch hook.

5. The frictional damper according to claim 1, wherein the cap comprises a radial flange for the end face to bear against the open end of the housing.

6. The frictional damper according to claim 1, wherein the cap is arranged, secured against torsion, on the housing.

7. The frictional damper according to claim 1, wherein the housing comprises a receiving portion to receive the cap.

8. The frictional damper according to claim 7, wherein the receiving portion extends up to the open end.

9. The frictional damper according to claim 1, wherein the frictional element is at least one of arranged pre-stressed along the longitudinal axis between the housing and the cap and arranged pre-stressed in a radial direction relative to the longitudinal axis between the tappet and the cap.

10. The frictional damper according to claim 1, wherein the cap is of sleeve-like design.

11. The frictional damper according to claim 10, wherein the cap has a circumferentially closed sleeve portion.

12. The frictional damper according to claim 10, wherein the cap is not of slotted design.

13. The frictional damper according to claim 1, wherein the cap comprises a frictional element socket, at least a portion of the frictional element being arranged in the frictional element socket.

14. The frictional damper according to claim 1, wherein a portion of the cap is located radially adjacent to the frictional element and a portion of the housing with respect to the longitudinal axis.

15. The frictional damper according to claim 1, wherein a portion of the cap is located adjacent to the frictional element.

16. The frictional damper according to claim 1, wherein the cap comprises a frictional element socket, at least a portion of the frictional element being arranged in the frictional element socket.

17. The frictional damper according to claim 1, wherein a portion of the cap is located adjacent to the frictional element.

18. The frictional damper according to claim 1, wherein the cap comprises a frictional element socket, at least a portion of the frictional element being arranged in the frictional element socket.

* * * * *